(12) United States Patent
Schoenenborn

(10) Patent No.: US 6,983,787 B2
(45) Date of Patent: Jan. 10, 2006

(54) RECUPERATIVE EXHAUST-GAS HEAT EXCHANGER FOR A GAS TURBINE ENGINE

(75) Inventor: Harald Schoenenborn, Karlsfeld (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 10/637,046

(22) Filed: Aug. 8, 2003

(65) Prior Publication Data

US 2004/0108095 A1   Jun. 10, 2004

(30) Foreign Application Priority Data

Aug. 8, 2002 (DE) .............................. 102 36 380

(51) Int. Cl.
  *F23L 15/02* (2006.01)
(52) U.S. Cl. .............................. 165/4; 165/10; 165/82; 60/39.511
(58) Field of Classification Search .............. 165/81, 165/82, 67, 4, 10; 60/39.511
See application file for complete search history.

(56) References Cited

U.S. PATENT DOCUMENTS

| | | | | |
|---|---|---|---|---|
| 4,511,106 A | * | 4/1985 | Graves ......................... | 248/65 |
| 4,940,084 A | | 7/1990 | Grieb | |
| 4,974,413 A | * | 12/1990 | Szego ...................... | 60/39.511 |
| 4,986,344 A | * | 1/1991 | Maier ........................... | 165/67 |
| 5,094,290 A | * | 3/1992 | Buckreus ...................... | 165/83 |
| 5,243,815 A | * | 9/1993 | Maier et al. .................. | 60/796 |
| 6,474,408 B1 | * | 11/2002 | Yeh et al. ...................... | 165/82 |

FOREIGN PATENT DOCUMENTS

| | | |
|---|---|---|
| DE | 36 35 548 C1 | 10/1986 |
| DE | 41 18 777 A1 | 6/1991 |
| GB | 2228991 A | 9/1990 |
| GB | 2261914 A | 6/1993 |

* cited by examiner

Primary Examiner—Terrell McKinnon
(74) Attorney, Agent, or Firm—Crowell & Moring LLP

(57) ABSTRACT

A recuperative exhaust-gas heat exchanger for a gas turbine engine is provided which has a crossflow/counterflow matrix around which the hot turbine exhaust gas flows, a distributing tube for directing the air delivered by a compressor into the crossflow/counterflow matrix and a collecting tube which is arranged parallel to the distributing tube and is intended for discharging the compressor air, heated via the crossflow/counterflow matrix, to a consumer. End faces of the distributing and collecting tubes which are remote from the compressor and consumer are closed. The closed end face of the collecting tube is firmly connected axially and radially to the turbine casing.

3 Claims, 2 Drawing Sheets

RECUPERATIVE EXHAUST-GAS HEAT EXCHANGER FOR A GAS TURBINE ENGINE

BACKGROUND AND SUMMARY OF THE INVENTION

This application claims the priority of German Patent Document 102 36 380.3, filed Aug. 8, 2002, the disclosure of which is expressly incorporated by reference herein.

The invention relates to a recuperative exhaust-gas heat exchanger for a gas turbine engine, said recuperative exhaust-gas heat exchanger having a crossflow/counterflow matrix around which hot turbine exhaust gas flows, a distributing tube for directing air delivered by a compressor into the crossflow/counterflow matrix, and a collecting tube which is arranged parallel to the distributing tube and is intended for discharging the compressor air, heated via the crossflow/counterflow matrix, to a consumer, end faces of the distributing and collecting tubes which are remote from the compressor and consumer being closed.

The use of recuperative exhaust-gas heat exchangers in gas turbine engines is known. Such exhaust-gas heat exchangers, in addition to a heat exchanger casing, basically comprise a distributing tube for feeding "cold" air, delivered by a compressor, into a "crossflow/counterflow matrix", around which the hot turbine exhaust gas flows, and a collecting tube for discharging the now heated "hot" compressor air to a suitable consumer, e.g. the combustion chamber of the gas turbine engine. Those end faces of the distributing and collecting tubes which are remote from the compressor and consumer are as a rule of closed design. The feeding of the air from the distributing tube into the crossflow/counterflow matrix or the discharge of the air from the crossflow/counterflow matrix into the collecting tube is effected via a plurality of openings/holes arranged one behind the other and made in the lateral surface of the tubes. In order to be able to achieve the desired rate of flow, a plurality of such hole rows have to be provided in the axial direction. Those regions of the lateral surface of the distributing and collecting tubes which have the holes are referred to below as a hole zone.

The crossflow/counterflow matrix comprises in turn a multiplicity of hairpin-shaped lancets or tubes combined to form a tube bundle. Each tube within the tube bundle corresponds with an associated opening from the hole zone of the distributing and collecting tubes. Each tube bundle is in each case fastened to the distributing tube and the collecting tube arranged parallel thereto and is arranged such as to project laterally in a U shape. German Patent Document DE-C 36 35 548 and corresponding U.S. Pat. No. 4,800,955, for example, have disclosed such a heat exchanger.

Furthermore, German Patent Document DE 41 18 777 A1 and corresponding U.S. Pat. No. 5,243,815 disclose a device for the compact connection of a recuperative exhaust-gas heat exchanger to a gas turbine engine. The design in this case is such that loads acting on the heat exchanger, such as force due to weight, shock loads, e.g. as the cause of non-steady operating states, or the like, are not absorbed by the heat exchanger casing itself, but are passed via "intermediate plates" directly into the gas turbine casing. A design feature of the disclosed device consists, inter alia, in the fact that the collecting tube is mounted in an axially movable manner in the region of its closed end face.

In this case, as experience has shown, the fact that the force which acts on the closed end face of the collecting tube due to the high internal pressure is not passed directly into the turbine casing proves to be disadvantageous. On the contrary, these forces are passed via the lateral surface of the collecting tube to the opposite end face of the collecting tube. In the hole zone, which has a high notch factor as a result of the hole rows in the axial tube axis direction, this force flow leads to high stress peaks and thus to increased wear and short service life.

An aspect of the invention is to resolve these problems by a novel design of the mounting of such distributing and collecting tubes which avoids the disadvantages.

Starting from a recuperative exhaust-gas heat exchanger of the type mentioned at the beginning, this aspect may be achieved according to certain preferred embodiments of the invention in that the closed end face of the collecting tube is firmly connected axially and radially to the turbine casing.

In this amazingly simple manner, it is now ensured that the forces acting on the closed end face of the collecting tube can be passed directly into the turbine casing, that is to say a force flow from the closed end face of the collecting tube directly into the turbine casing is ensured.

The mounting of the collecting tube according to certain preferred embodiments of the invention leads to substantial advantages.

By the specific guiding of the force flow directly into the turbine casing, the stress peaks in the notch radii are markedly reduced. This leads to a marked prolongation of the service life of the component, a factor which at the same time results in cost savings. The constructional components required may also be designed to be lighter than hitherto.

According to an embodiment of the invention, the region comprising the closed end face of the collecting tube is designed as a cover plate. The cover plate is preferably releasably connected to the collecting tube. The use of a releasable cover plate proves to be advantageous, since the cover plate can be attached to both end faces of the collecting tube and thus use or repair is facilitated.

An exchanger casing which is free of load and thus optimized in terms of weight is ensured by the collecting tube likewise being mounted in the turbine casing in the region of its open end face facing the consumer.

In order to ensure stress-free mounting of the collecting tube, that mounting of the collecting tube which is assigned to the open end face is designed with axial bearing play.

According to a further embodiment of the invention, the end faces of the collecting tube have respective tube bends for the air feed and the air discharge, and the collecting tube is mounted in the turbine casing in the region of the two tube bends. In this case, the collecting tube is firmly mounted axially and radially in the region of the one tube bend, whereas in the region of the other tube bend the mounting of the collecting tube is designed with axial bearing play. The axial forces of the tube bends are passed directly into the casing and do not load the collecting tube. This design also has the advantages mentioned at the beginning.

Other objects, advantages and novel features of the present invention will become apparent from the following detailed description of the invention when considered in conjunction with the accompanying drawings.

DETAILED DESCRIPTION OF THE DRAWINGS

Figure 1:
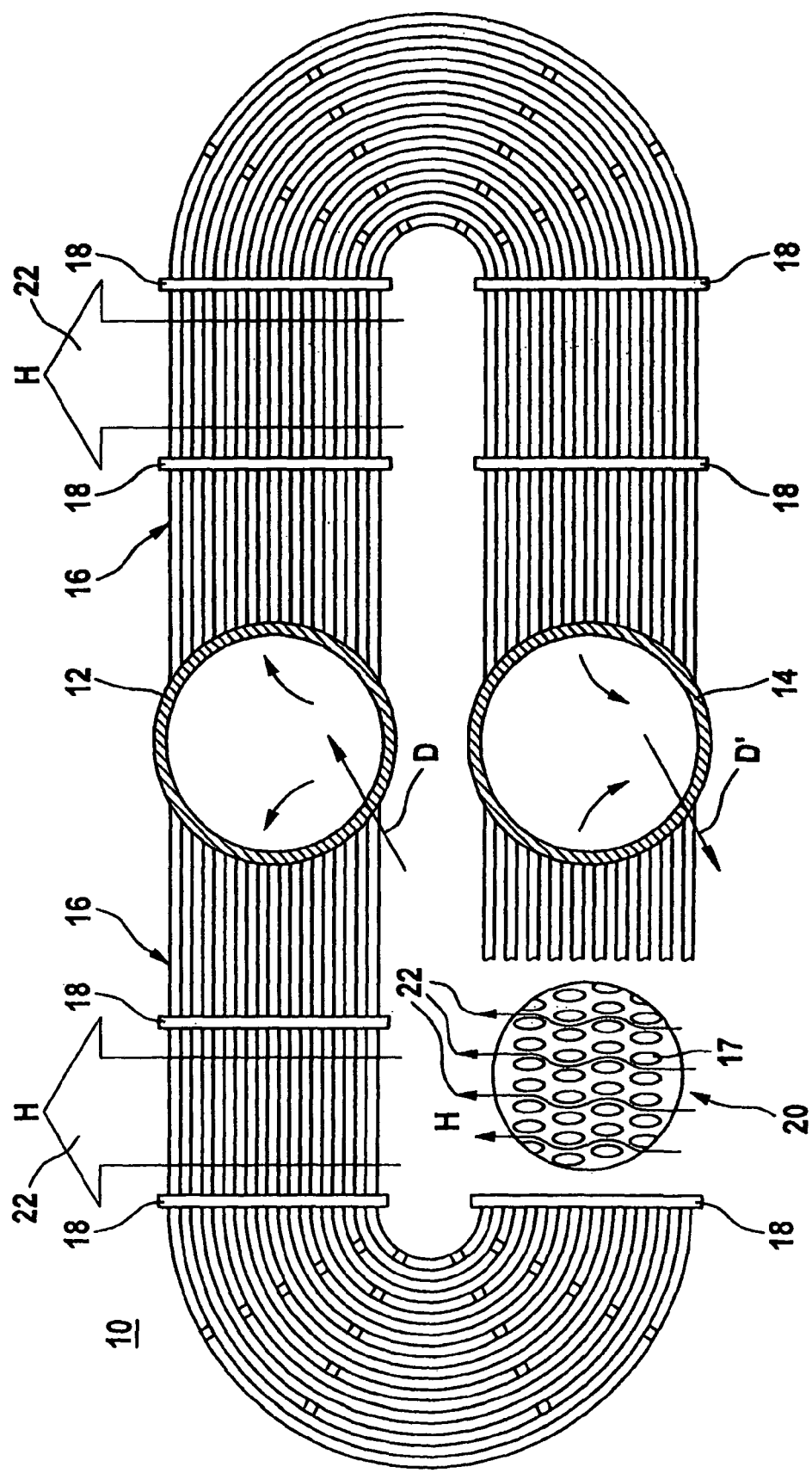
FIG. 1 shows the basic design of a heat exchanger in crossflow/counterflow type of construction.

A recuperative exhaust-gas heat exchanger, designated overall by the reference numeral 10 in FIG. 1, basically comprises a distributing tube 12, a collecting tube 14 arranged parallel thereto, and a crossflow/counterflow matrix 16 projecting laterally from the said tubes in a U shape.

It can be seen from the sectional representation, arranged on the left at the bottom, of the crossflow/counterflow matrix 16 that the crossflow/counterflow matrix 16 has a multiplicity of hairpin-shaped tubes or lancets 17. The lancets 17 are each fastened to the distributing and collecting tubes 12, 14. They correspond with the openings/holes—not visible in this representation—which are made for this purpose in the lateral surface of the distributing and collecting tubes 12, 14. The plurality of these openings/holes in the lateral surface of the distributing and collecting tubes 12, 14 is also referred to below as hole zone.

A plurality of spacers 18 ensure that the shape of the tube bundle 20, composed of a plurality of lancets 17, of the crossflow/counterflow matrix 16 is retained. The arrangement of the individual lancets 17 of the crossflow/counterflow matrix 16 is such that a good flow around the tube bundle 20 with a hot turbine exhaust-gas jet H is made possible. The flow around the crossflow/counterflow matrix 16 with the hot turbine exhaust-gas jet H is indicated by arrows 22.

The further components of a gas turbine engine in addition to the recuperative exhaust-gas heat exchanger 10 are not shown for reasons of clarity The functioning of the recuperative exhaust-gas heat exchanger described above is described below.

Cold compressed air is fed to the distributing tube 12 from a compressor according to arrow D. The cold compressed air flows from the distributing tube 12 via the openings/holes made in the lateral surface into the crossflow/counterflow matrix 16 projecting laterally in a U shape. The cold compressor air is heated by the flow around the crossflow/counterflow matrix 16 with the hot turbine exhaust gas H. After flowing through the crossflow/counterflow matrix 16 and being fed into the collecting tube 14, the air now heated is fed according to arrow D' to a suitable consumer, e.g. the combustion chamber.

Figure 2:
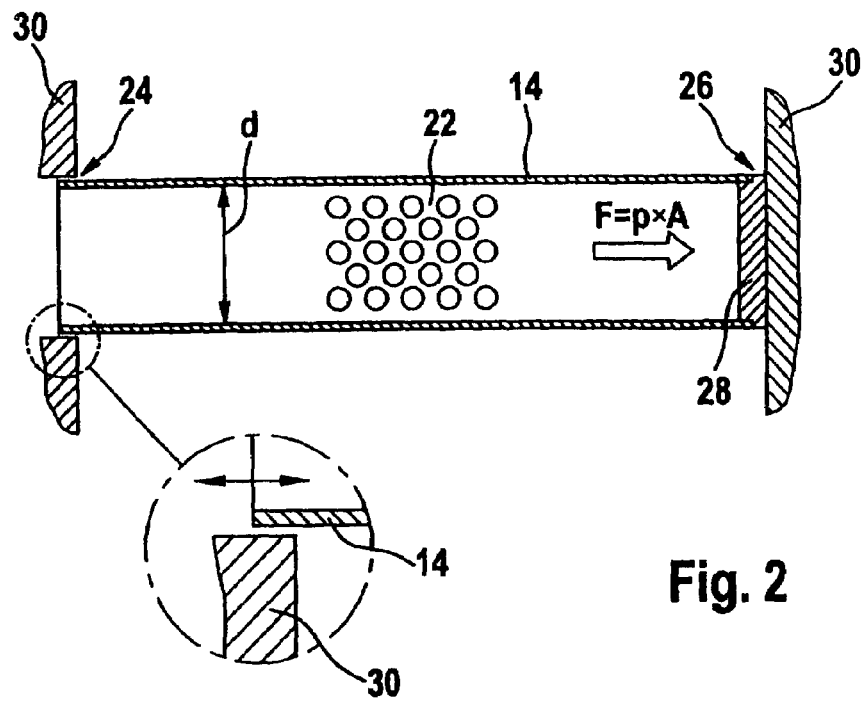
FIG. 2 shows a collecting tube with the axial and radial fixing according to the invention in the region of the closed end face of the collecting tube.

FIG. 2 schematically shows the mounting according to certain preferred embodiments of the invention of the collecting tube 14 from FIG. 1. The hole zone already mentioned above is schematically indicated and provided overall with the reference numeral 22. The collecting tube 14 has a diameter d and has a left-hand end face 24 and a right-hand end face 26. The compressed air D is discharged from the collecting tube 14 to the combustion chamber via the left-hand, open end face 24. The opposite, right-hand end face 26 of the collecting tube 14 is of closed design. A cover plate 28 is provided for this purpose in the present exemplary embodiment.

It can be seen from the schematic representation of the mounting that the end face 26, closed with the cover plate 28, of the collecting tube 14 is firmly connected axially and radially to a turbine casing 30, whereas the mounting of the collecting tube 14 in the turbine casing 30 in the region of the left-hand end face 24 has axial play.

The mounting of the collecting tube 14 ensures that a force $$F = p \cdot \pi \left(\frac{d}{2}\right)^2$$

acting on the closed end face on account of the high internal pressure p is passed directly into the turbine casing 30. A force flow via the lateral surface of the collecting tube 14 and thus via the hole zone 22 to the left-hand end face 24 is successfully avoided. By this type of mounting, the stress peaks in the notch radii of the hole zone 22 are reduced, which brings about a marked increase in the service life of the collecting tube 14.

Figure 3:
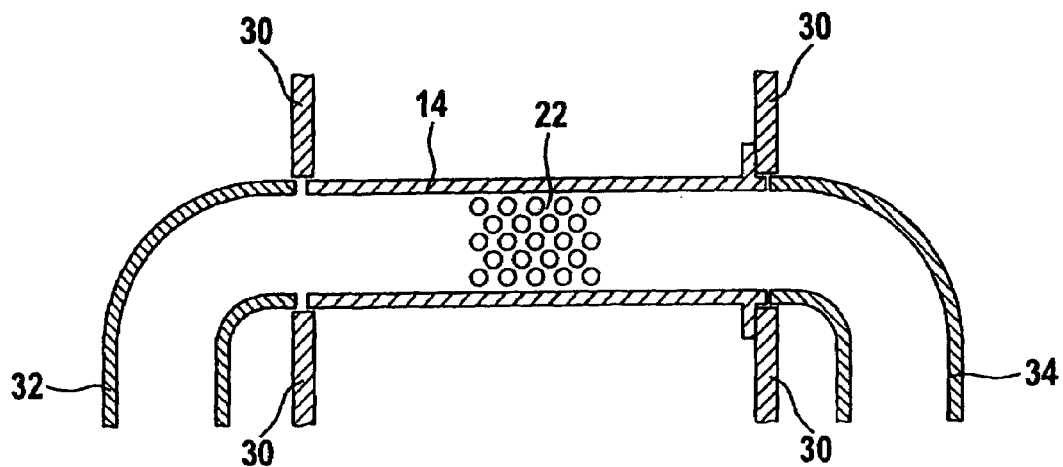
FIG. 3 shows a collecting tube with two tube bends, attached to the tube ends, according to a second embodiment of the invention.

A further embodiment of the mounting is shown in FIG. 3. Here, however, in contrast to the previous embodiment, the left-hand end face 24 is provided with a first tube bend 32 for the air feed and the right-hand end face 26 is provided with a second tube bend 34 for the air discharge.

In order to prevent a force flow via the hole zone 22, the collecting tube 14 is again firmly mounted axially and radially in the turbine casing 30 in the region of the second tube bend 34, whereas in the region of the first tube bend 32 the mounting of the collecting tube 14 in the turbine casing 30 has axial bearing play.

The axial forces of the tube bends are passed directly into the casing and do not load the collecting tube.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A recuperative exhaust-gas heat exchanger for a gas turbine engine, said recuperative exhaust-gas heat exchanger having a crossflow/counterflow matrix around which hot turbine exhaust gas flows, a distributing tube for directing air delivered by a compressor into the crossflow/counterflow matrix, and a collecting tube which is arranged parallel to the distributing tube and is intended for discharging the compressor air, heated via the crossflow/counterflow matrix, to a consumer, each of the distributing and collecting tubes having opposite ends, wherein one end of the collecting tube is firmly connected axially and radially to a turbine casing and the other end of the collecting tube has axial play with respect to the turbine casing, and wherein the one end of the collecting tube is closed by a cover plate.

2. The recuperative exhaust-gas heat exchanger according to claim 1, wherein the other end of the collecting tube is an open end facing the consumer.

3. A recuperative exhaust-gas heat exchanger for a gas turbine engine, said recuperative exhaust-gas heat exchanger having a crossflow/counterflow matrix around which hot turbine exhaust gas flows, a distributing tube for directing air delivered by a compressor into the crossflow/counterflow matrix, and a collecting tube which is arranged parallel to the distributing tube and is intended for discharging the compressor air, heated via the crossflow/counterflow matrix, to a consumer, end faces of the distributing and collecting tubes which are remote from the compressor and consumer being closed, wherein the closed end face of the collecting tube is firmly connected axially and radially to a turbine casing, wherein a region comprising the closed end face of the collecting tube is designed as a cover plate, and wherein the cover plate is releasably connected to the collecting tube.

\* \* \* \* \*